(12) United States Patent
Zhu et al.

(10) Patent No.: US 12,124,870 B2
(45) Date of Patent: Oct. 22, 2024

(54) AUTOMATIC SELECTION OF NODES ON WHICH TO PERFORM TASKS

(71) Applicant: INTERNATIONAL BUSINESS MACHINES CORPORATION, Armonk, NY (US)

(72) Inventors: Xiao Zhen Zhu, Beijing (CN); Xiao Ling Chen, Beijing (CN); Yang Cao, Beijing (CN); Yun Juan Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 17/489,999

(22) Filed: Sep. 30, 2021

(65) Prior Publication Data
US 2023/0102795 A1   Mar. 30, 2023

(51) Int. Cl.
G06F 9/48 (2006.01)
(52) U.S. Cl.
CPC .......... *G06F 9/4856* (2013.01); *G06F 9/4881* (2013.01)
(58) Field of Classification Search
None
See application file for complete search history.

(56) References Cited

U.S. PATENT DOCUMENTS

| 7,810,099 | B2 * | 10/2010 | Dettinger | G06Q 10/0633 709/201 |
| 10,970,113 | B1 * | 4/2021 | Kurtzer | G06F 9/5005 |
| 11,676,158 | B2 * | 6/2023 | Kurian | G06F 9/542 705/7.39 |
| 2007/0297593 | A1 * | 12/2007 | Qiang | H04Q 3/0054 379/207.02 |

(Continued)

FOREIGN PATENT DOCUMENTS

| CN | 107045459 A | 8/2017 |
| CN | 108694053 A | 10/2018 |

(Continued)

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Adam Lee
(74) *Attorney, Agent, or Firm* — Schmeiser, Olsen & Watts, LLP; Edward Wixted

(57) ABSTRACT

A method, computer program product, and computer system for implementing tasks on managed nodes. A specified task to be performed by an Ansible module on one or more managed nodes of two or more managed nodes is received. The one or more managed nodes are determined based on an attribute value of a hostDecision attribute of the Ansible module. The attribute value may be primaryNode, allNodes, (Continued)

or Dynamic, where: primary Node requires the one or more managed nodes to be a primary node, allNodes requires the one or more managed nodes to be the two or more managed nodes, and Dynamic requires the one or more managed nodes to be determined dynamically based on runtime information. The Ansible module is sent to the one or more managed nodes to perform the task on the one or more managed nodes.

20 Claims, 10 Drawing Sheets

(56) References Cited

U.S. PATENT DOCUMENTS

| | | | | |
|---|---|---|---|---|
| 2009/0254913 | A1* | 10/2009 | Kawano | G06F 9/5038 |
| | | | | 718/103 |
| 2016/0154913 | A1* | 6/2016 | Altare | G06Q 50/04 |
| | | | | 703/13 |
| 2017/0034023 | A1* | 2/2017 | Nickolov | H04L 43/0817 |
| 2018/0077007 | A1* | 3/2018 | Olson | H04L 45/745 |
| 2018/0121822 | A1* | 5/2018 | Aghasaryan | G06F 11/079 |
| 2018/0176086 | A1* | 6/2018 | Thwaites | H04L 41/0886 |
| 2019/0097900 | A1* | 3/2019 | Rodriguez | G06F 11/1484 |
| 2019/0342166 | A1* | 11/2019 | Chaware | G06F 9/5055 |
| 2020/0136900 | A1* | 4/2020 | Tarrant | H04L 41/0893 |
| 2020/0252271 | A1* | 8/2020 | Elliott, IV | G06F 9/5016 |
| 2020/0344147 | A1* | 10/2020 | Pianigiani | H04L 12/4633 |
| 2020/0401447 | A1* | 12/2020 | Xiao | G06F 9/44505 |
| 2021/0019196 | A1* | 1/2021 | Geffin | G06F 9/5016 |
| 2021/0117098 | A1* | 4/2021 | Saad | G06F 3/0619 |
| 2021/0352099 | A1* | 11/2021 | Rogers | G06N 20/00 |
| 2021/0406079 | A1* | 12/2021 | Atur | G06F 9/4881 |
| 2022/0006726 | A1* | 1/2022 | Michael | H04L 45/24 |
| 2022/0138327 | A1* | 5/2022 | Panicker | G06F 21/577 |
| | | | | 726/25 |
| 2022/0150298 | A1* | 5/2022 | Kurian | G06F 9/5077 |
| 2022/0164265 | A1* | 5/2022 | Krishnan | G06F 11/2028 |
| 2022/0291938 | A1* | 9/2022 | Goulding | G06F 8/76 |
| 2022/0382655 | A1* | 12/2022 | Patodia | G06Q 10/0635 |
| 2023/0019705 | A1* | 1/2023 | Zettel, II | G06F 8/71 |
| 2023/0367654 | A1* | 11/2023 | Kurian | G06F 9/5083 |

FOREIGN PATENT DOCUMENTS

| | | |
|---|---|---|
| CN | 109104305 A | 12/2018 |
| CN | 109634918 A | 4/2019 |
| CN | 109905263 A | 6/2019 |
| CN | 111782232 | 10/2020 |
| CN | 111857767 A | 10/2020 |
| CN | 112416524 A | 2/2021 |
| CN | 112491606 | 3/2021 |
| TW | 1709083 B | 10/2020 |
| WO | 2019218463 A1 | 11/2019 |

OTHER PUBLICATIONS

Controlling playbook execution: strategies and more, Retrieved from Internet: https://docs.ansible.com/ansible/latest/user_guide/playbooks_strategies.html, Retrieved on Aug. 27, 2021, 7 pages.

Patterns: targeting hosts and groups, Retrieved from Internet: https://docs.ansible.com/ansible/latest/user_guide/intro_patterns.html, Retrieved on Aug. 27, 2021, 6 pages.

Red Hat Ansible Certified Content for IBM Z content solution, Retrieved from Internet: https://www.IBM.com/support/z-content-solutions/ansible/, Retrieved on 8/27/22021, 9 pages.

International Search Report, International application No. PCT/CN2022/103297, Date of Mailing Aug. 25, 2022, 9 pages.

* cited by examiner

… … …

AUTOMATIC SELECTION OF NODES ON WHICH TO PERFORM TASKS

BACKGROUND

Embodiments of the present invention relate generally to deployment of Ansible modules to perform tasks in an Ansible platform using an Ansible engine, and more particularly to a selective determination of which managed nodes the tasks are to be performed on, for scenarios in which the tasks may not be required to be performed on all managed nodes in an Ansible host group.

Ansible is an Information Technology (IT) engine deployed on an Ansible IT platform. The Ansible engine, which is widely used software in cloud platforms, automates application deployment by using Ansible modules to perform one or more tasks specified in an Ansible playbook. The one or more tasks are to be performed by the Ansible modules on all managed nodes of a host group (hereinafter, "host"). The host group is specified in the Ansible playbook. The managed nodes of the host are identified in an Ansible inventory.

An Ansible playbook is a text script typically written in Yet Another Markup Language (YAML). The Ansible playbook specifies, inter alia: a playbook name, the one or more tasks to be performed, and an identification of the host group whose managed nodes are identified in an Ansible inventory.

The host may be specific to a category within a system and the managed nodes of the host are instances of the category. Examples of host categories are web servers, database servers, mail servers, storage repositories, etc. For example, if a host is specific to web servers, then each managed node of the host is a specific web server located at an address such as an Internet Protocol (IP) address.

The Ansible engine runs in an Ansible control node used for, inter alia, selecting managed nodes on which the tasks are to be performed using the Ansible playbook and Ansible inventory as input.

An Ansible role provides a skeleton for an independent and reusable collection of modules, tasks variables, files and templates which can be automatically loaded into an Ansible playbook. Thus, an Ansible playbook is a collection of Ansible roles. Ansible roles are independent of each other. An Ansible Galaxy is a repository of Ansible roles.

Ansible collections are a distribution format for Ansible content. Ansible playbooks, roles, modules, and plugins may be packaged and distributed using Ansible collections.

FIG. 1 depicts an Ansible control node 110 sending Ansible module 111, using Secure Shell (SSH) protocol, to mutually independent managed nodes 1, 2, 3, 4, respectively, of host group 150 for a purpose of having the module 111 perform tasks 130 on the managed nodes 1, 2, 3, 4, respectively, in accordance with the prior art. The tasks 130 and the host group 150 are specified in the Ansible playbook 140. The managed nodes 1, 2, 3, 4 of the host group 150 are specified in the Ansible inventory 160.

In the configuration of FIG. 1 which is typically used in the prior art, the managed nodes are independent and isolated, so that automatic actions to be performed by the managed nodes do not impact each other or one another. Therefore, a group of managed nodes would perform the same actions. Thus, the "host group" is used in the Ansible Playbook so that the same tasks could be easily performed against a group of managed nodes.

The adoption and usage of Ansible has been increased over time. Many different platforms have joined an Ansible ecosystem. Such platforms introduce managed nodes which could be visible to each other or one another, and actions performed on one managed node might impact other managed nodes, where a system in which managed nodes are visible to each other or one another is denoted herein as Systems S which is illustrated in FIG. 1.

FIG. 2 depicts an Ansible control node 210 sending Ansible module 211, using SSH protocol, to mutually visible managed nodes 1, 2, 3, 4, respectively, of host groups 251, 252, 253 for the module 211 to perform tasks on the managed nodes 1, 2, 3, 4, in accordance with the prior art.

The tasks 230 and the host groups 251, 252, 253 are specified in the Ansible playbook 240. The managed nodes 1, 2, 3, 4 of the host groups 251, 252, 253 are specified in the Ansible inventory 260, where only host group 251 (OSGroup) is explicitly shown in Ansible inventory 260.

In FIG. 2, Play1 in Ansible Playbook 240 specifies host group OSgroup and tasks to be performed on all OS operating systems within System S. The tasks include two commands, namely command1 and command2, such that each such command does not impact other OS operating systems.

Play2 in Ansible Playbook 240 specifies host group node1.bj.com and tasks to be performed only once in the Sysplex 265 which encompasses managed nodes 1 and 2. A Sysplex refers to a cluster of independent instances of the OS operating system within a complex of multiple computers. The connectivity of managed nodes 1 and 2 to a coupling facility (CF) 270 enables managed nodes 1 and 2 to share data through coupling-facility links.

Play3 in Ansible Playbook 240 specifies switching back to the host OSgroup to perform independent actions.

Support of Ansible by System S enables deployment of System S for hybrid cloud usage. However, the Ansible playbook 240 may present, inter alia, the following two problems.

A first problem pertaining to the Ansible playbook is that the end user has to break one logic process into multiple logic processes, so that hosts can be switched, which could make a playbook for System S appear different than for other platforms which introduces a learning curve.

A second problem pertaining to the Ansible playbook is that the end user has to decide whether each task should be performed once or on all systems S, which may generate errors and decrease efficiency.

In addition, in the hybrid cloud scenario, Ansible is one of the most popular Infrastructure as Code (IaC) tools. The Ansible playbook is an IaC artifact. In an ideal case, a same IaC artifact provisions the same infrastructure. However, due to the problems discussed supra with respect to FIG. 2, it is difficult to keep using the same IaC artifact (i.e., Ansible playbook) when the automation is shifted to an on-premises environment from a public cloud.

FIG. 3A depicts an Ansible playbook 310 and FIG. 3B depicts an Ansible inventory 361 for public cloud 330, and Ansible playbook 320 and Ansible inventory 362 for an on-premises ("On-Prem") environment 340, in accordance with the prior art. The Ansible playbooks 310 and 320 are different playbooks.

The Sysplex 365 includes managed node 1 and managed node 2. The connectivity of managed nodes 1 and 2 to a coupling facility (CF) 370 enables managed nodes 1 and 2 to share data through coupling-facility links.

In the public cloud 330, the tasks in Ansible playbook 310 could be performed on all OS operating systems, because the OS operating systems are isolated from each other or one another. In the on-premises environment 340, the tasks in Ansible Playbook 320 should be performed only once in a specific OS operating system, because the OS operating systems might be in the same Sysplex. Thus, different playbooks are used for a public cloud and an on-premises environment, which is inefficient and introduces error vulnerability.

In summary with the prior art, Ansible does not have sufficient flexibility and analysis capability to handle impacts of cross managed nodes which could generate, inter alia, the following issues: high learning curve to create automation for cross managed nodes; low productivity to create automation for cross managed nodes; automation scripts which are error prone; and inconsistent IaC code in a hybrid-cloud scenario.

SUMMARY

Embodiments of the present invention provide a method, a computer program product and a computer system, for implementing tasks on managed nodes. One or more processors of an Ansible engine within an Ansible control node in a computer system, receive a specification of a task to be performed by an Ansible module on one or more managed nodes of a plurality of managed nodes of a host.

The one or more processors determine the one or more managed nodes based on an attribute value of a hostDecision attribute of the Ansible module. The attribute value is selected from the group consisting of primaryNode, allNodes, and Dynamic, wherein primary Node requires the one or more managed nodes to consist of a primary node selected from the plurality of managed nodes, wherein allNodes requires the one or more managed nodes to consist of the plurality of managed nodes, and wherein Dynamic requires the one or more managed nodes to be determined dynamically based on runtime information including a current status, obtained by the primary node, of one or more factors pertaining to the managed nodes of the plurality of managed nodes.

The one or more processors send the Ansible module to the one or more managed nodes to perform the task on the one or more managed nodes.

DETAILED DESCRIPTION

Embodiments of the present invention automatically select Ansible managed nodes to avoid cross host impact. The ansible Engine is enhanced by supporting a static or dynamic primary node determination for an Ansible inventory. The Ansible engine is also enhanced to introduce a new attribute hostDecision for Ansible modules, whose value should be primary Node, allNodes or Dynamic. The hostDecision attribute is used to select managed nodes statically or dynamically based on various different factors.

In various embodiments, the Ansible engine statically or dynamically determines in which managed nodes, of a host group of managed nodes, a specific task specified in an Anbsible playbook should be performed by Ansible modules, in dependence on the attribute hostDecision which is specific to an Ansible module configured to perform the specific task. The Ansible module is a computer program (i.e., software) configured to perform the specific task. Thus, the Ansible module performs the specific task at a managed node by being executed as software at the managed node by one or more computer processors. The hostDecision attribute can have values of: "primaryNode", "allNodes" and "Dynamic".

For the value of "primaryNode" for the hostDecision attribute, the task will be performed only on a primary node of the nodes in a host group.

For the value of "allNodes" for the hostDecision attribute, the task will be performed on all nodes in the host group.

For the value of "Dynamic" for the hostDecision attribute, the node or nodes (in a host group) on which the task will be performed is determined dynamically based on a current status of one or more factors pertaining to the managed nodes of the host, such one or more factors including, inter alia, Central Processing Unit (CPU) capacity weight, system environment variables, health status, workload, busy status, etc.

Figure 1:
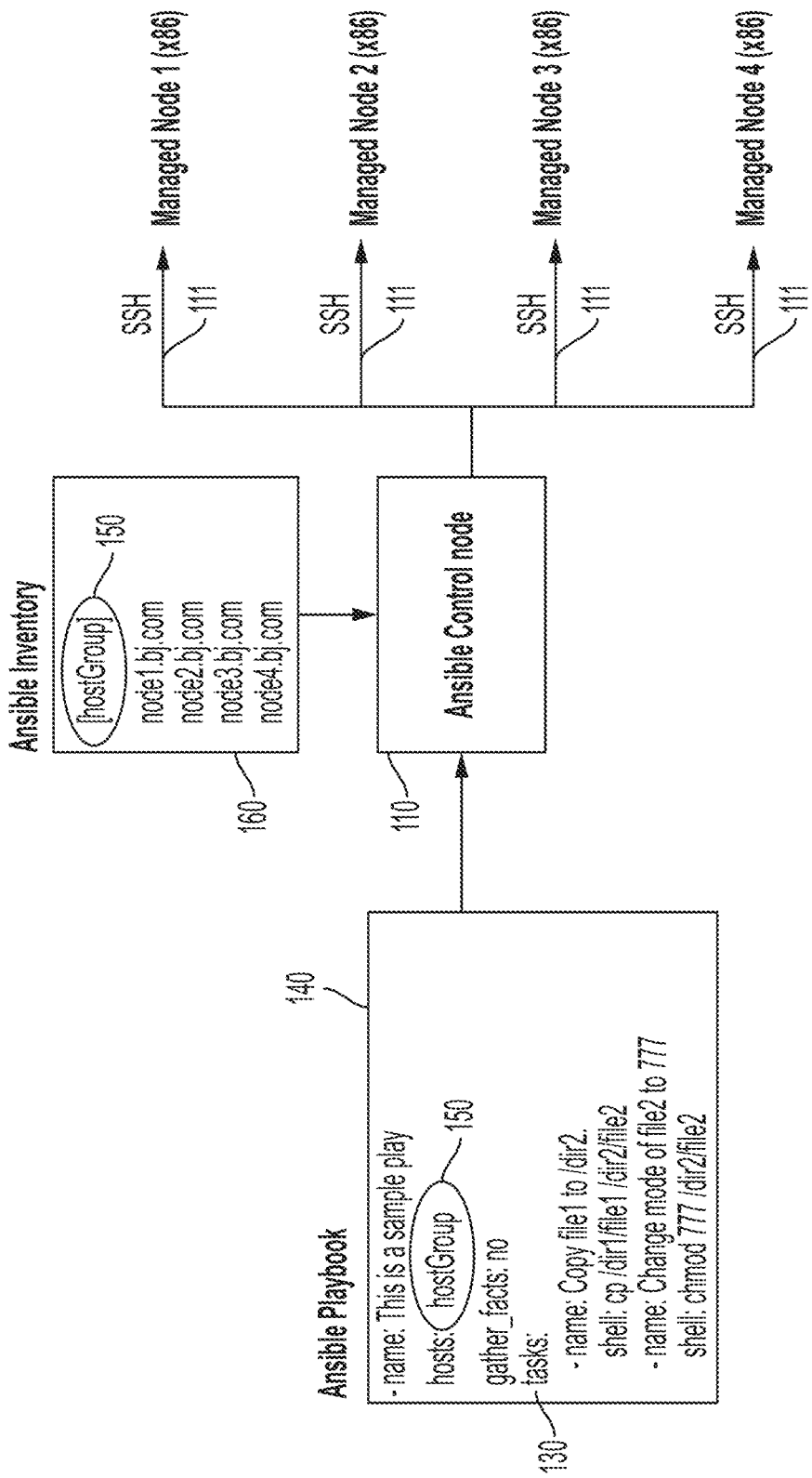
FIG. 1 depicts an Ansible control node sending modules, using Secure Shell (SSH) protocol, to mutually independent managed nodes of a host group for the modules to perform tasks on the managed nodes, in accordance with the prior art.
Figure 2:
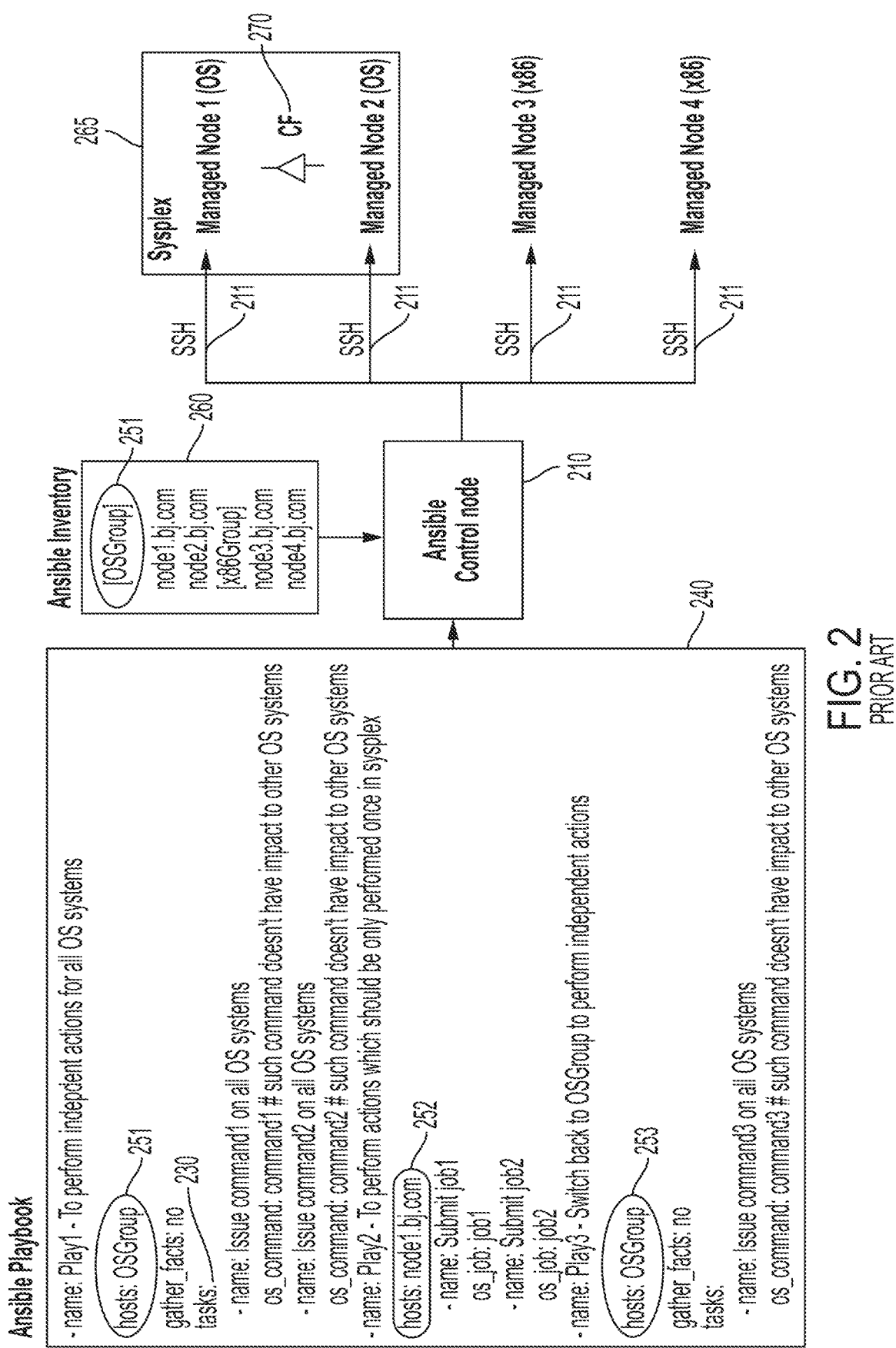
FIG. 2 depicts an Ansible control node sending modules, using SSH protocol, to mutually visible managed nodes of host groups for the modules to perform tasks on the managed nodes, in accordance with the prior art.
Figure 3A:
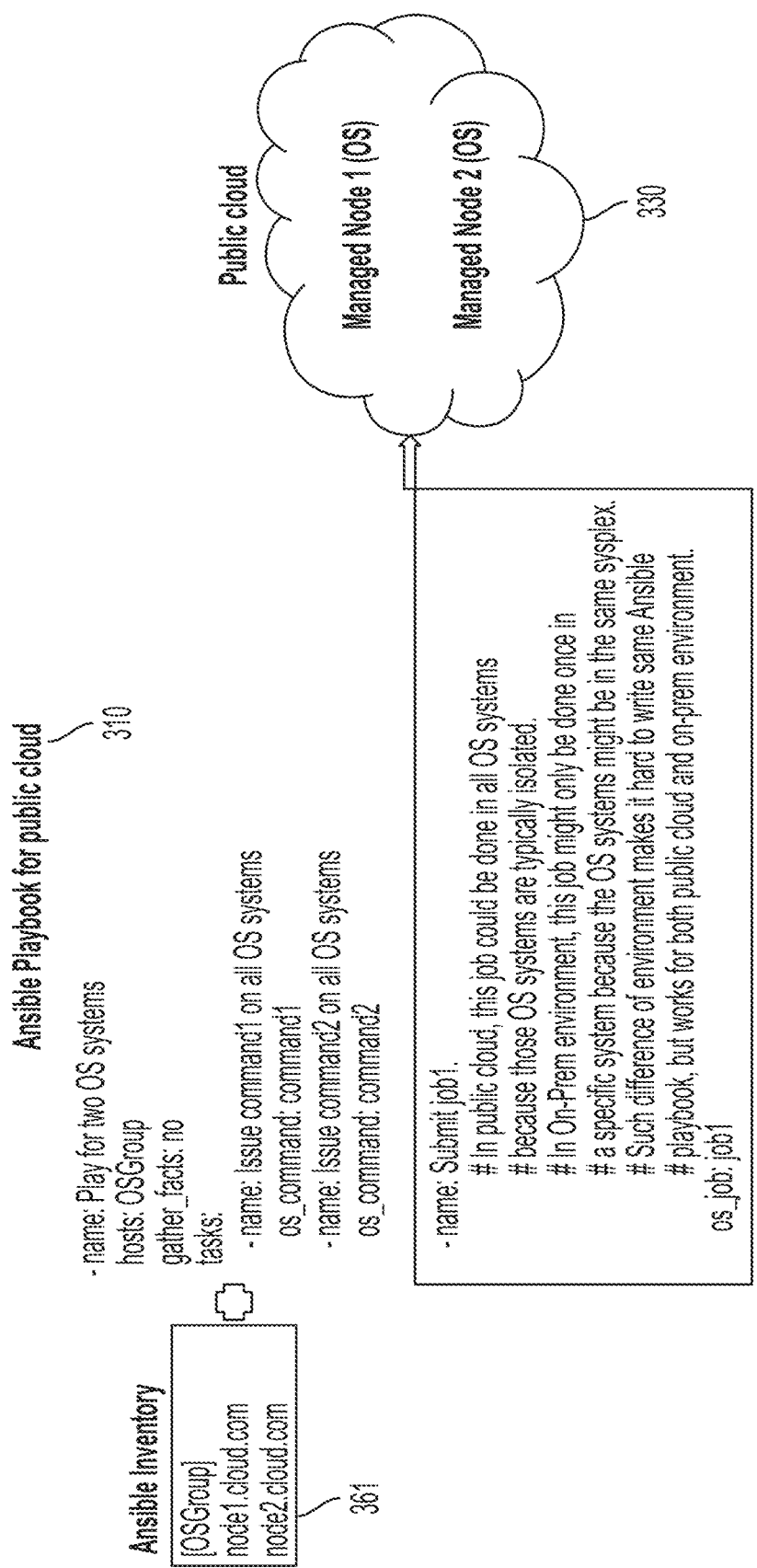
FIG. 3A depicts an Ansible playbook for a public cloud and FIG. 3B depicts an Ansible playbook for an on-premises ("On-Prem") environment, in accordance with the prior art
Figure 3B:
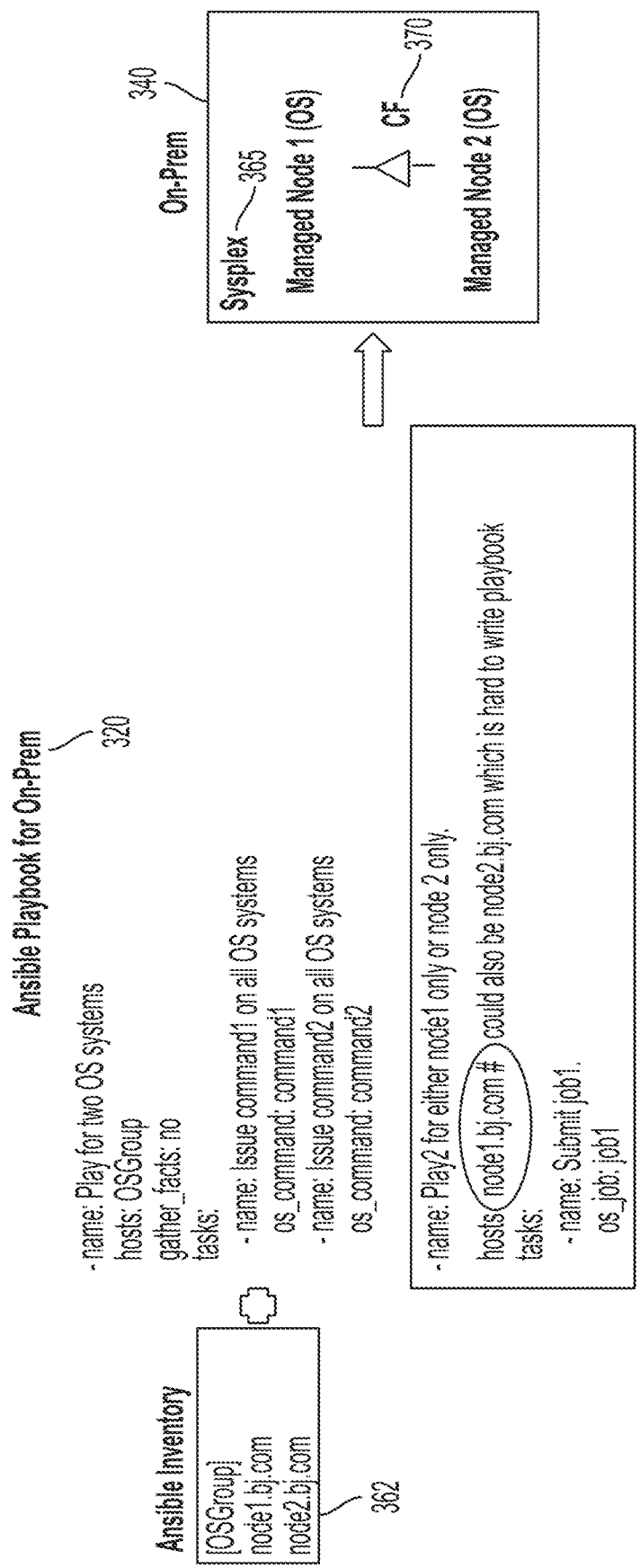
Figure 4:
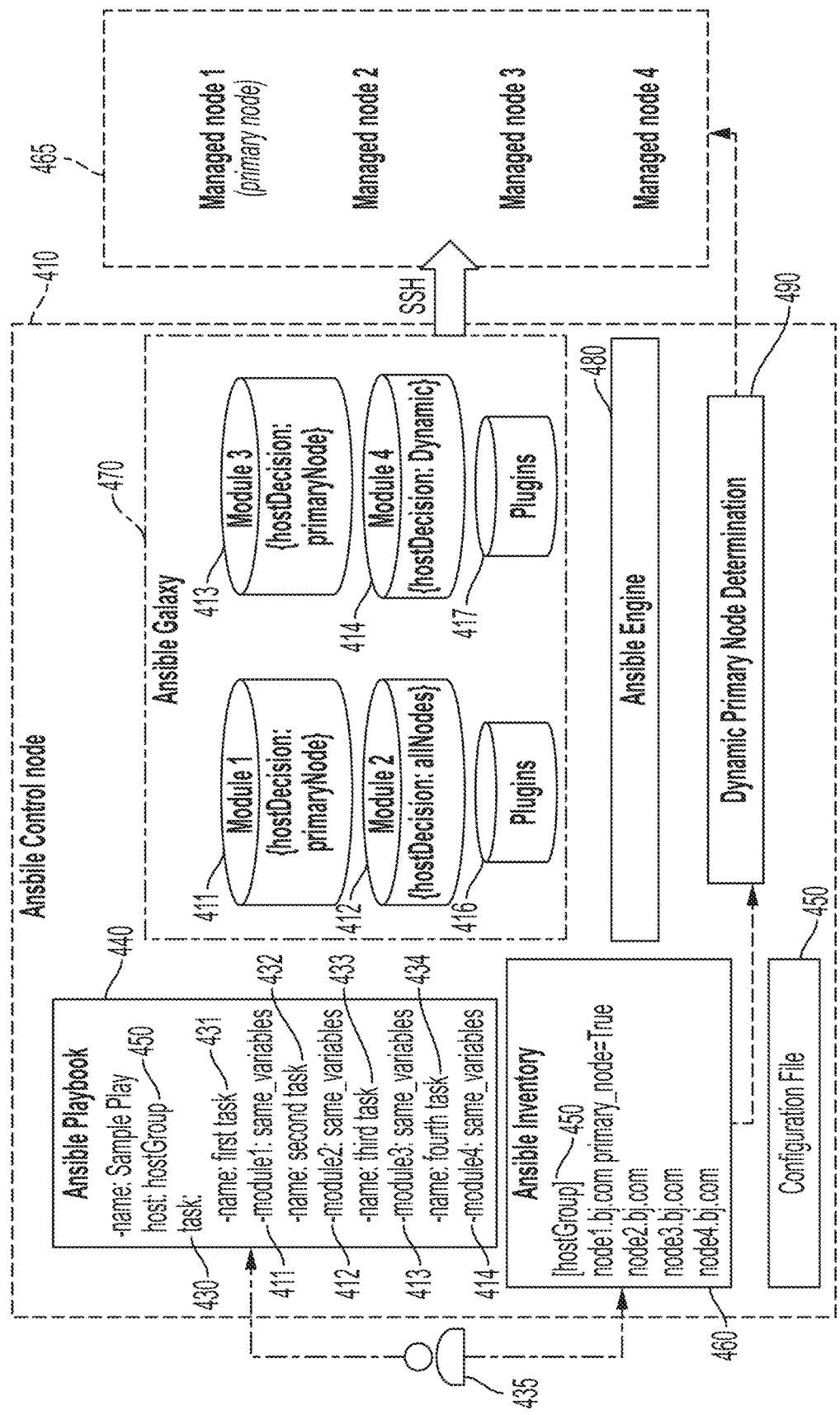
FIG. 4 depicts an Ansible control node, in accordance with embodiments of the present invention.

FIG. 4 depicts an Ansible control node 410, in accordance with embodiments of the present invention.

The Ansible control node 410 comprises Ansible Galaxy 470, Ansible playbook 440, Ansible inventory 460, Ansible engine 480, Dynamic Primary Node Determination 490 and configuration file 450. In one embodiment, the Dynamic Primary Node Determination 490 is outside of the Ansible engine 480 as shown. In one embodiment, the Dynamic Primary Node Determination 490 is within the Ansible engine 480.

The Ansible Galaxy 470 comprises Ansible modules 411, 412, 413, 414 and may also comprise plugins 416 and 417 which may be invoked by the Ansible engine 480 to perform specialized functions required or needed by the Ansible engine 480 in conjunction with the task to be performed.

The Ansible inventory 460 specifies host group 450 and managed nodes 1, 2, 3, 4 as identified via "node1.bj.com", "node2.bj.com", "node3.bj.com", and "node4.bj.com", respectively.

The Ansible playbook 440 specifies host group 450 ("hostGroup"), tasks 430 (including tasks 431, 432, 433, 434), and Ansible modules 411, 412, 413, 414 configured to perform tasks 431, 432,433, 434, respectively.

The Ansible engine 480 sends Ansible modules 411, 412, 413, 414, using Secure Shell (SSH) protocol, to managed node locations 465 of managed nodes 1, 2, 3, 4, for modules 411, 412, 413, 414 to each perform module-specific tasks 430 on one or more managed nodes of the managed nodes 1, 2, 3, 4, respectively, in dependence on each module's hostDecision attribute. Managed node 1 is a primary node in the example of FIG. 4.

In one embodiment for each Ansible module, the host-Decision attribute value for the Ansible module is received by the Ansible engine 480 from any source of a variety of sources including, inter alia, a developer of the Ansible module, a user of the Ansible module, an initiator or user of the task to be performed by the Ansible module, the primary node of a group of nodes on which, or a subset thereof, the task is to be performed.

In one embodiment, the configuration file 450 specifies the hostDecsion attribute value for each module (Module 1: primaryNode; Module 2: allNodes; Module 3: primaryNode; Module 4: Dynamic).

Thus, Ansible Module 411 has a hostDecsion attribute value of "primaryNode". Module 412 has a hostDecsion attribute value of "allNodes". Module 413 has a hostDecsion attribute value of "primaryNode". Module 414 has a hostDecsion attribute value of "Dynamic".

In one embodiment, the Dynamic Primary Node Determination 490, under control by the Ansible engine 480, may be used to determine which managed node is a primary node.

For embodiments of the present invention, an end user 435 may statically specify a primary node of the host group 450 in Ansible inventory 460, or the Ansible engine 480 may dynamically determine the primary node with the added Primary Node Determination Module 490. In FIG. 4, managed node 1 is a primary node as shown at managed node locations 465 and Ansible inventory 460.

The primary node is the only managed node in the host group on which a specific task may be performed if the hostDecsion attribute value for the module performing the specific task is "primaryNode". Thus, those Ansible tasks whose associated modules have hostDecision=primaryNode will not be performed on other managed nodes in the same host group.

There are two modes to determine which managed node is the primary node: a static mode and a dynamic mode.

In the static mode for determining which managed node is the primary node, the end user 435 statically specifies a primary node of the host group 450 in Ansible inventory 460, which results in the primary node being specified in the host group 450 in the Ansible inventory 460 as shown. The primary node may also be specified in managed node locations 465 as shown. The Ansible engine 480 receives an identification of the primary node either directly from the user or from storage within the Ansible control node 470 such as from the Ansible inventory 460 or from the configuration file 450.

In the dynamic mode for determining which managed node is the primary node, the Ansible engine 480 may dynamically determine the primary node using the added Primary Node Determination Module 490, which results in the primary node being specified in managed node locations 465 as well as being stored in the configuration file 450 and in other storage locations within the Ansible control node 410.

There are two types of dynamic processing to determine which managed node is the primary node, based on a current status of one or more factors pertaining to the managed nodes of the host.

In a first type of dynamic processing to determine which managed node is the primary node, the managed nodes are on a public cloud with a node group, for example, of: [nodeGroup1] node1.cloud.com and node2.cloud.com, in which case node1 and node2 are standalone nodes normally used as pre-test environments and could be isolated from each other. This first type of "dynamic" processing identifies which managed node is the primary node for node1.cloud.com and which managed node is the primary node for node2.cloud.com. From an implementation perspective, a certain processing will be executed on both node1 and node2. Since in this public cloud case, node1 and node 2 are isolated from each other and don't see each other, node1 would consider itself to be a primary node and node2 would consider itself to be a primary node. Thus, the dynamic processing returns node1's primary node as node1 to the Ansible Engine 480. Similarly, the dynamic processing returns node2's primary node as node2 to the Ansible Engine 480. The Ansible engine 480 stores an identification of the primary node in the Ansible inventory 460 and in the configuration file 450.

Later, when the Ansible engine 480 starts to perform tasks, if "hostDecision" of a specific task is "PrimaryNode", the task for node1 will be performed on node1 and the same task for node 2 will be performed on node 2. In other words, the same task will be performed on every node in the "nodeGroup1".

In a second type of dynamic processing to determine which managed node is the primary node, the managed nodes are on an on-premises ("On-Prem") environment with a node group, for example of: [nodeGroup2] node3.customer.com and node4.customer.com, in which case node3 and node4 are in a customer's data center. If node3 and node4 are in System S, it is very likely that node3 and node4 are in the same Sysplex, which means node3 and node4 can see and impact each other. Since node3 and node4 share the same Sysplex, some tasks can only be performed once (i.e., either on node3 or on node4). During the "dynamic" processing, node3 and node4 are aware of each other due to being in the same Sysplex. Thus, the primary node could be determined dynamically based on a current status of one or more factors pertaining to the managed nodes of the host, wherein the managed nodes are node3 and node4 for this example. The one or more factors pertaining to the managed nodes of the host include, inter alia, Central Processing Unit (CPU) capacity weight, system environmental variables, and health status.

As an example of using CPU capacity weight to dynamically determine the primary node, System S could include multiple nodes, each node being assigned a different CPU capacity. In one embodiment, the node having the largest assigned CPU capacity is determined to be the primary node.

As an example of using system environmental variables to dynamically determine the primary node, System S could include multiple nodes, each node having a specified software product (e.g., CICS, DB2) installed. In one embodiment, the node having the latest version of the software product installed is determined to be the primary node.

As an example of using health status to dynamically determine the primary node, System S could include the health status of multiple products (i.e., hardware products, software products, and combinations thereof) installed on each node. The health status for each product is scored and reflects an extent of compliance of the product with respect to hardware requirements, system requirements, security requirements, etc. In one embodiment, the node having the highest health status score is determined to be the primary node.

If the hostDecision attribute is Dynamic, embodiments of the present invention determine managed nodes on which a task is to be performed.

In one embodiment, a determination of on which managed nodes a task should be performed may be made by a primary node after the Ansible engine sends to the primary node the module that performs the task in accordance with the module's hostDecision attribute. The primary node may dynamically determine on which managed nodes the task should be performed based on runtime information including, inter alia, a current status of one or more factors including system environmental variables, health data, workload status, etc. Then the primary node will return to the Ansible engine a list of one or more target nodes on which the task is to be performed. Then the Ansible engine stores the returned list of one or more target nodes in a storage area within the Ansible control node from which the list of target nodes may be subsequently accessed by the Ansible engine.

In one embodiment, a determination of on which managed nodes a task should be performed may be made by the Ansible engine after the Ansible engine receives, from a primary node, runtime information including, inter alia, system environmental variables, health data, workload status, etc. Then the Ansible engine stores the returned list of one or more target nodes in a storage area within the Ansible control node from which the list of target nodes may be subsequently accessed by the Ansible engine.

The following example illustrates how the Ansible engine identifies on which nodes a given task is to be performed if hostDecision is Dynamic.

The Ansible inventory for this example is:
[nodeGroup3]
node5.customer1.com
node6.customer1.com
node6.customer1.com
The primary node is node5.
The Ansible Playbook for this example is:
Play1:
host: nodeGroup3
Task 1 (calls Ansible module1 (module1's hostDecision is "primaryNode")
Task 2 (calls Ansible module2 (module2's hostDecision is "allNodes")
Task 3 (calls Ansible module3 (module3's hostDecision is "Dynamic")

When the Ansible engine performs Task1, Task1 will only be performed on node5, because Task1 is to be performed on the primary node only and the primary node is node5

When the Ansible engine performs Task2, Task2 will be performed on all nodes (node5, node6, node7).

When the Ansible engine performs Task3, Task3 will trigger "dynamic" processing to dynamically identify target nodes that Task 3 should be performed on. The processing will be performed using a special logic. The logic determines target nodes based on, but not limited to, factors of: workload balancing, health status, software installation version, and system environmental variables.

Which of the preceding factors (workload balancing, health status, software installation version, system environmental variables) will be used and how those factors depend on each module's implementation. For example, assume that the logic returns node5 and node7 as target nodes. Then Task3 will only be performed on node5 and node7 instead of all nodes. Illustratively, those factors may be used in System S as follows.

For the factor of workload balancing in this example, Task3 is to perform a batch job. The primary node of node5 could check out each node's current CPU utilization. If node7 has a lowest CPU utilization, the dynamic processing returns node7 as the target node because a batch job only needs to be performed once and it doesn't matter on which node in the same Sysplex (node5, node6 and node7 are in the same Sysplex) the job should be performed. Then Task3 will be performed only on node7 to implement the workload balancing.

For the factor of health status in this example, Task3 is to deploy a new CICS application to nodes. The application should not be deployed to a CICS server which is presently not healthy. Thus, the dynamic processing could check the health status of a CICS (e.g., through HealthCheck technology) server in each node and only returns nodes that have a healthy CICS server which is a subset of the nodes that does not include all of the nodes. Thus, Task3 will only be performed on the returned subset of the nodes instead on all nodes.

For the factor of software installation version in this example, Task3 is to deploy a CICS application to a node. The CICS application could be deployed to any node that has a CICS version number equal to or higher than a specified minimum CICS version number. The dynamic processing could scan the CICS version on each node and then return the node or nodes that satisfy the preceding minimum version requirement.

For the factor of system environmental variables in this example, Task3 is to apply a patch when a specified system environmental variable has a value of ON. The dynamic processing scans the specified system environmental variable of each node. If the specified system environmental variable of node6 and node7, but not of node5, is ON, then node6 and node7 will be returned as target nodes and Task3 will be performed only on node6 and node7.

Figure 5:
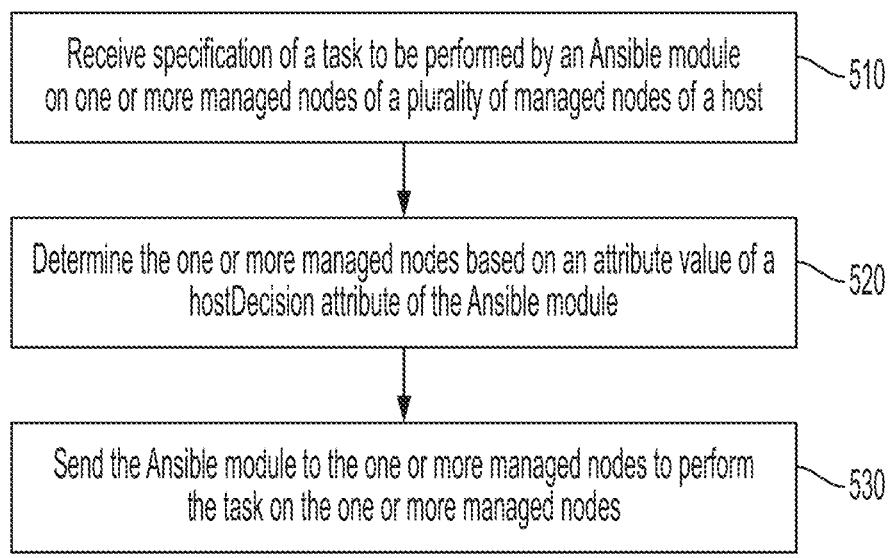
FIG. 5 is a flow chart describing a method for implementing tasks on managed nodes, in accordance with embodiments of the present invention.

FIG. 5 is a flow chart describing a method for implementing tasks on managed nodes, in accordance with embodiments of the present invention. The method of FIG. 5 includes steps 510-530.

Step 510 receives, by one or more processors of an Ansible engine within an Ansible control node in a computer system, a specification of a task to be performed by an Ansible module on one or more managed nodes of a plurality of managed nodes of a host.

Step 520 determines, by the one or more processors, the one or more managed nodes based on an attribute value of a hostDecision attribute of the Ansible module, wherein the attribute value is selected from the group consisting of primaryNode, allNodes, and Dynamic, wherein primary Node requires the one or more managed nodes to consist of a primary node selected from the plurality of managed nodes, wherein allNodes requires the one or more managed nodes to consist of the plurality of managed nodes, and wherein Dynamic requires the one or more managed nodes to be determined dynamically based on runtime information including a current status, obtained by the primary node, of one or more factors pertaining to the managed nodes of the plurality of managed nodes.

Step 530 sends, by the one or more processors, the Ansible module to the one or more managed nodes to perform the task on the one or more managed nodes.

Figure 6:
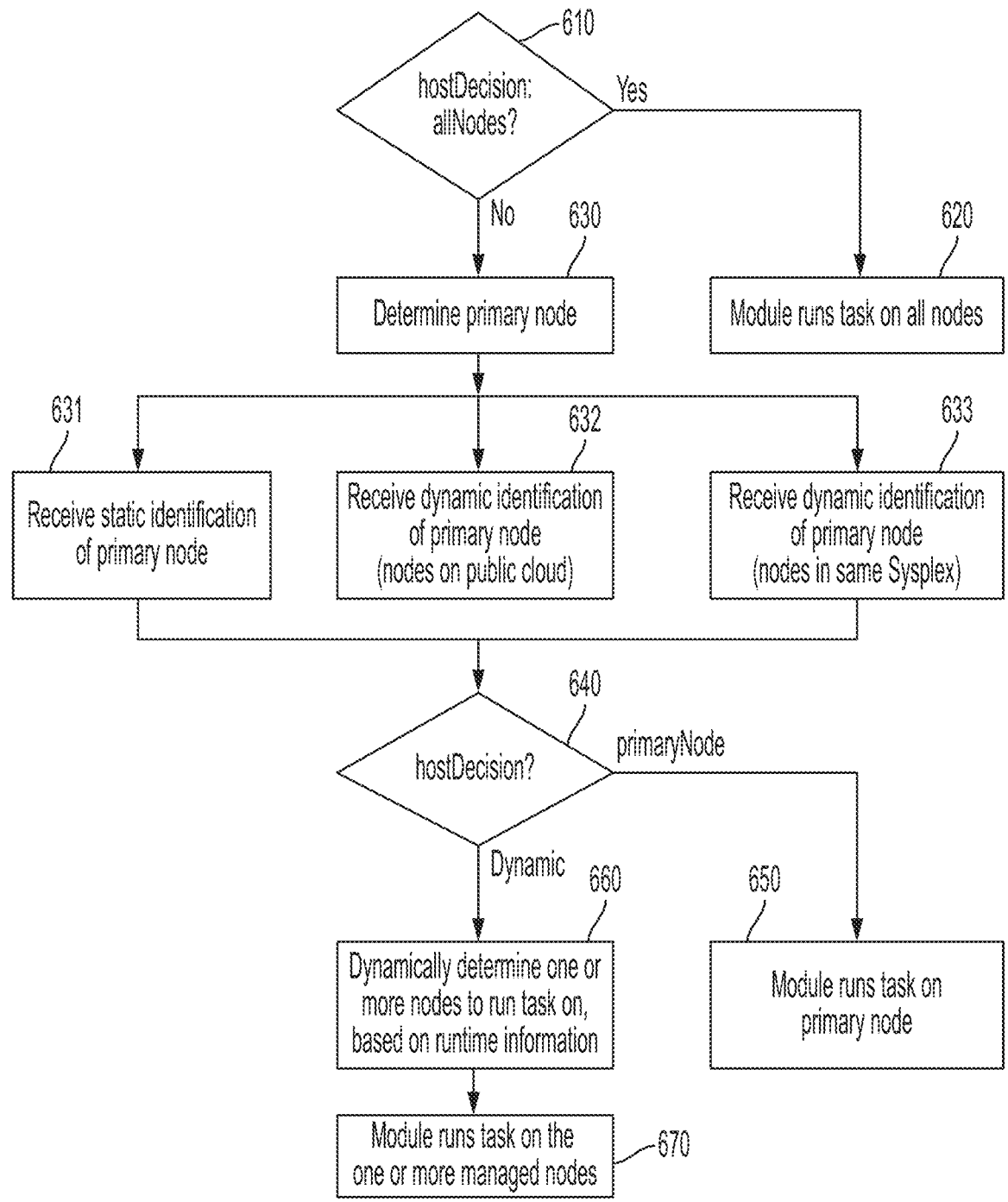
FIG. 6 is a flow chart describing a method for processing a hostDecision attribute, in accordance with embodiments of the present invention.

FIG. 6 is a flow chart describing a method for processing a hostDecision attribute, in accordance with embodiments of the present invention. The flow chart of FIG. 6 includes steps 610-670.

step 610 determines, by the Ansible engine, whether the hostdecision attribute has an attribute value of allNodes.

If step 610 determines that the hostdecision attribute has an attribute value of allNodes, then in step 620 the Ansible module runs the task on all managed nodes of the plurality of managed nodes of the host.

If step 610 does not determine that the hostdecision attribute has an attribute value of allNodes, then the host-Decision attribute is primaryNode or Dynamic and step 630 is next executed.

Step 630 determines the primary node in accordance with step 631, step 632, or step 633.

Step 631 receives, by the one or more processors, an identification of the primary node from an Ansible inventory within the Ansible control node, wherein the Ansible inventory stores the plurality of managed nodes and the identification of the primary node.

Step 632 receives, by the one or more processors, a dynamic identification of the primary node, wherein the plurality of managed nodes are on a public cloud such that the managed nodes of the plurality of managed nodes are isolated from each other or from one another, and wherein receiving the dynamic identification of the primary node comprises: receiving, from each managed node, a communication that each managed node is the primary node.

Step 633 receives, by the one or more processors, a dynamic identification of the primary node, wherein the plurality of managed nodes are in a same Sysplex within on an on-premises environment such that the managed nodes of the plurality of managed nodes are each aware of an existence of the other managed nodes of the plurality of managed nodes, and wherein receiving the dynamic identification of the primary node comprises: receiving the dynamic identification of the primary node via a dynamic determination of the primary node based on the current status of the one or more factors pertaining to the managed nodes of the plurality of primary nodes. In one embodiment, the one or more factors pertaining to the managed nodes include Central Processing Unit (CPU) capacity weight, system environmental variables, and health status.

Step 640 determines, by the Ansible engine, whether the hostdecision attribute has an attribute value of primaryNode or Dynamic.

If step 640 determines that the hostdecision attribute has an attribute value of primaryNode, then in step 650 the Ansible module runs the task on the primary node.

If step 640 determines that the hostdecision attribute has an attribute value of Dynamic, then step 660 is next executed.

Step 660 dynamically determines, by the one or more processors, the one or more managed nodes on which the task is to be performed based on the runtime information including the current status of one or more factors pertaining to the managed nodes of the plurality of managed nodes. In one embodiment, the one or more factors pertaining to the managed nodes include system environmental variables, health data, and workload status.

In step 670, the Ansible module runs the task on the one or more managed nodes dynamically determined in step 660.

In one embodiment, dynamically determining the one or more managed nodes on which the task is to be performed comprises: receiving, by the one or more processors from the primary node, a list of the one or more managed nodes after the primary node has dynamically determined the one or more managed nodes based on the runtime information.

In one embodiment, dynamically determining the one or more managed nodes on which the task is to be performed comprises: receiving, by the one or more processor from the primary node, the runtime information; and dynamically determining, by the one or more processors, the one or more managed nodes based on the runtime information received from the primary node.

In one embodiment, the Ansible control node includes an inventory file specifying the hostDecsion attribute for the Ansible module.

In one embodiment, the Ansible control node further comprises an Ansible Galaxy comprising the Ansible module and a plugin configured to perform a specialized function required or needed by the Ansible engine in conjunction with the task to be performed.

In one embodiment, the Ansible module performs the task on the one or more managed nodes.

Figure 7:
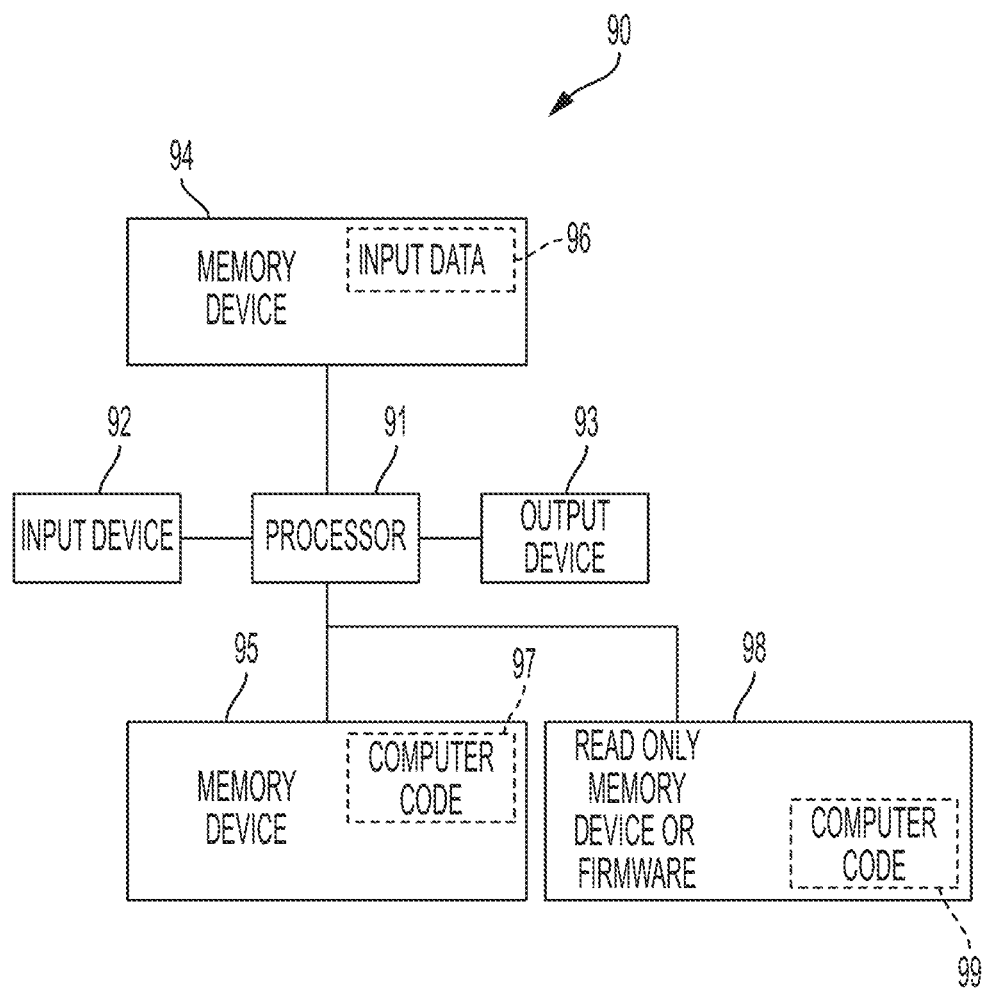
FIG. 7 illustrates a computer system, in accordance with embodiments of the present invention.

FIG. 7 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
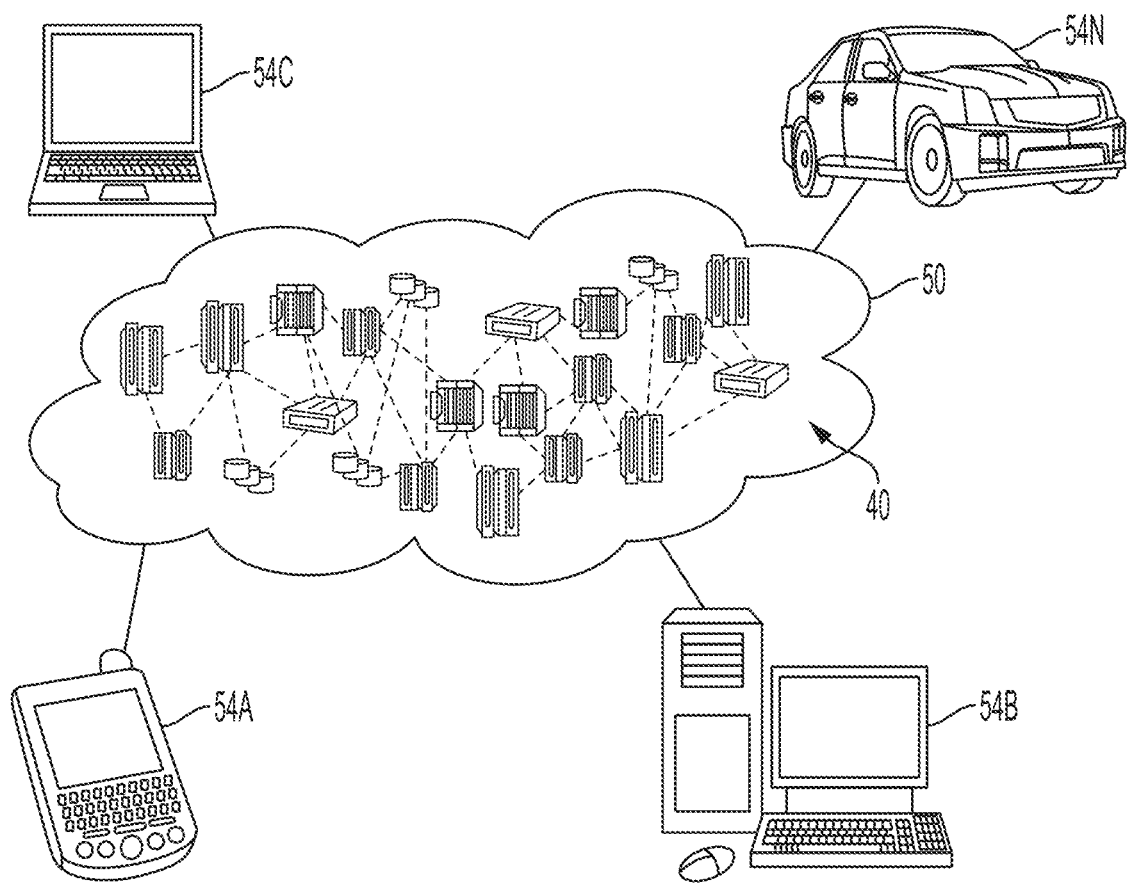
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
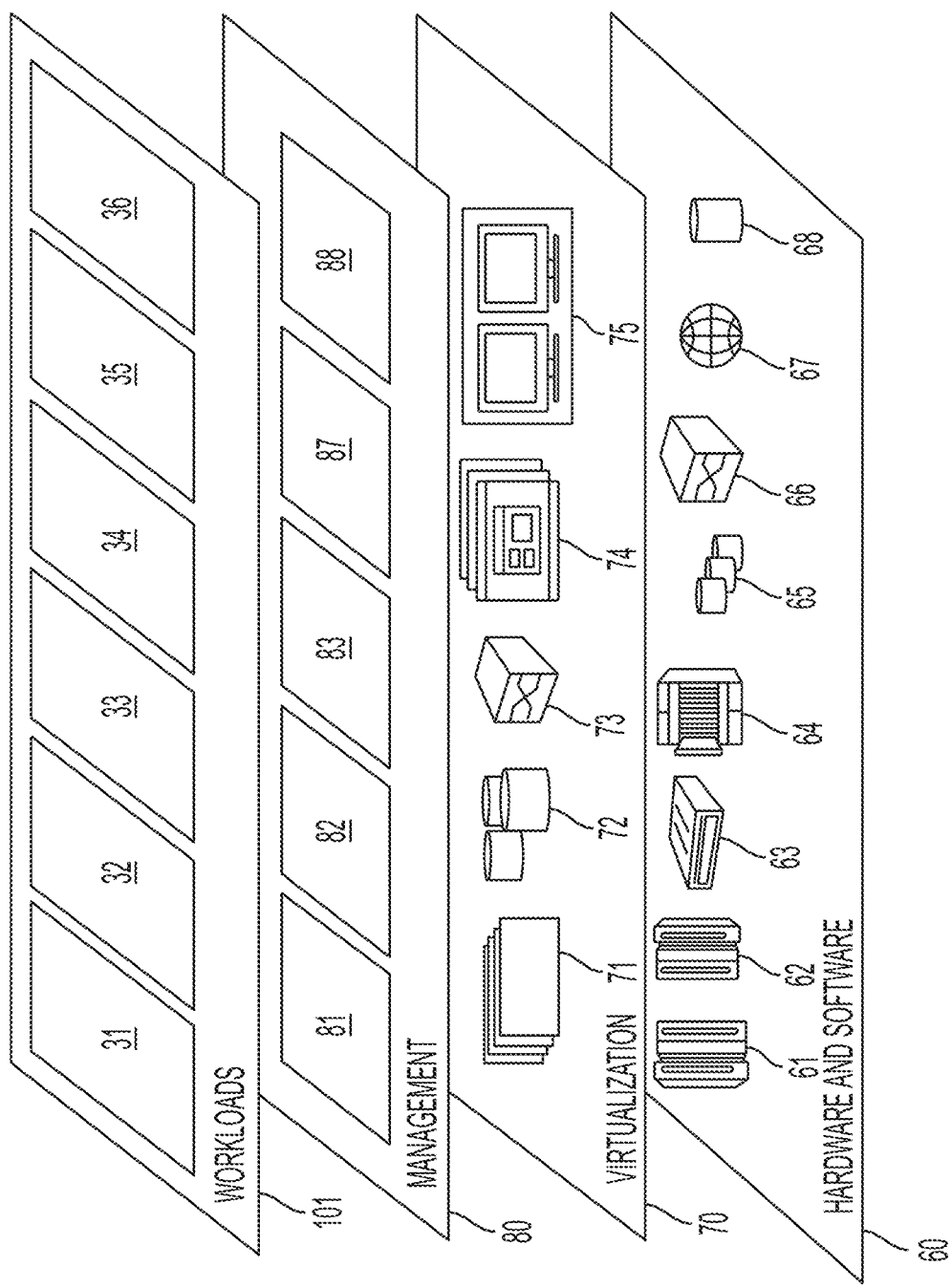
FIG. 9 depicts abstraction model layers, in accordance with embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and implementing tasks on managed nodes 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method comprising:
receiving, by one or more processors of an Ansible engine within an Ansible control node, a specification of a task to be executed by an Ansible module of a plurality of Ansible modules on one or more managed nodes of a plurality of managed nodes of a host, wherein the Ansible control node is separate from the host;
sending, by the one or more processors, the Ansible module to the one or more managed nodes to execute the task on the one or more managed nodes, wherein the Ansible module is specific to the task; and
executing the task by the Ansible module on the one or more managed nodes,
wherein an attribute value of a hostDecision attribute of the Ansible module is primaryNode, allNodes, or Dynamic, wherein primary Node requires the one or more managed nodes to consist of a primary node, wherein allNodes requires the one or more managed nodes to consist of the plurality of managed nodes, and wherein Dynamic requires the one or more managed nodes to be based on runtime information including a current status, received by the Ansible engine, of one or more factors pertaining to the one or more managed nodes of the plurality of managed nodes,
wherein the attribute value of the hostDecision attribute is specific to the Ansible module and is received from a source, and
wherein the one or more managed nodes on which the task is executed is based on the attribute value of the hostDecision attribute.

2. The method of claim 1, wherein the attribute value is primaryNode.

3. The method of claim 2, wherein the method further comprises:
receiving, by the one or more processors, an identification of the primary node from an Ansible inventory within the Ansible control node, said Ansible inventory storing the identification of the primary node.

4. The method of claim 2, wherein the method further comprises:
receiving, by the one or more processors from an end user, a static identification of the primary node stored by the end user in an Ansible inventory of the Ansible control node.

5. The method of claim 2, wherein the method further comprises:
receiving, by the one or more processors, a dynamic identification of the primary node.

6. The method of claim 5, wherein the plurality of managed nodes are on a public cloud such that the plurality of managed nodes are isolated from each other or from one another, and wherein said receiving the dynamic identification of the primary node comprises:
receiving, from each managed node, a communication that said each managed node is the primary node.

7. The method of claim 5, wherein the plurality of managed nodes are in a same Sysplex within an on-premises environment such that the plurality of managed nodes are each aware of an existence of the other managed nodes of the plurality of managed nodes, and wherein said receiving the dynamic identification of the primary node comprises:
receiving the dynamic identification of the primary node based on a current status of the one or more factors pertaining to the one or more managed nodes.

8. The method of claim 7, wherein the one or more factors include Central Processing Unit (CPU) capacity weight, system environmental variables, and health status.

9. The method of claim 1, wherein the attribute value is Dynamic.

10. The method of claim 9, wherein the one or more factors include system environmental variables, health data, and workload status.

11. The method of claim 9, wherein the method further comprises:
receiving, by the one or more processors, a list of the one or more managed nodes from the primary node.

12. The method of claim 9, wherein the method further comprises:
receiving, by the one or more processors, the runtime information from the primary node.

13. The method of claim 1, wherein the Ansible control node further comprises a configuration file specifying the hostDecision attribute for the Ansible module.

14. The method of claim 1, wherein the Ansible control node further comprises an Ansible Galaxy comprising the Ansible module and a plugin configured to perform a specialized function required or needed by the Ansible engine in conjunction with the task that is executed.

15. The method of claim 1, wherein the source from which the attribute value of the hostDecision attribute is received is a developer of the Ansible module, a user of the Ansible module, an initiator or user of the task, or the primary node.

16. The method of claim 1, wherein the Ansible control node includes an Ansible Playbook.

17. A computer program product, comprising one or more computer readable hardware storage devices having computer readable program code stored therein, said program code containing instructions executable by one or more processors of an Ansible engine within an Ansible control node to execute a method comprising:
receiving, by the one or more processors, a specification of a task to be executed by an Ansible module of a plurality of Ansible modules on one or more managed nodes of a plurality of managed nodes of a host, wherein the Ansible control node is separate from the host;
sending, by the one or more processors, the Ansible module to the one or more managed nodes to execute the task on the one or more managed nodes, wherein the Ansible module is specific to the task; and
executing the task by the Ansible module on the one or more managed nodes,
wherein an attribute value of a hostDecision attribute of the Ansible module is primaryNode, allNodes, or Dynamic, wherein primary Node requires the one or more managed nodes to consist of a primary node, wherein allNodes requires the one or more managed nodes to consist of the plurality of managed nodes, and wherein Dynamic requires the one or more managed nodes to be based on runtime information including a current status, received by the Ansible engine, of one or more factors pertaining to the one or more managed nodes of the plurality of managed nodes,
wherein the attribute value of the hostDecision attribute is specific to the Ansible module and is received from a source, and
wherein the one or more managed nodes on which the task is executed is based on the attribute value of the hostDecision attribute.

18. The computer program product of claim 17, wherein the source from which the attribute value of the hostDecision attribute is received is a developer of the Ansible module, a user of the Ansible module, an initiator or user of the task, or the primary node.

19. A computer system, comprising one or more processors of an Ansible engine within an Ansible control node in the computer system, one or more memories, and one or more computer readable hardware storage devices, said one or more hardware storage devices containing program code executable by the one or more processors via the one or more memories to execute a method comprising:
receiving, by the one or more processors, a specification of a task to be executed by an Ansible module of a plurality of Ansible modules on one or more managed nodes of a plurality of managed nodes of a host, wherein the computer system is separate from the host; and
sending, by the one or more processors, the Ansible module to the one or more managed nodes to execute the task on the one or more managed nodes, wherein the Ansible module is specific to the task; and
executing the task by the Ansible module on the one or more managed nodes,
wherein an attribute value of a hostDecision attribute of an Ansible module is primaryNode, allNodes, or Dynamic, wherein primary Node requires the one or more managed nodes to consist of a primary node, wherein allNodes requires the one or more managed nodes to consist of the plurality of managed nodes, and wherein Dynamic requires the one or more managed nodes to be based on runtime information including a current status, received by the Ansible engine, of one or more factors pertaining to the one or more managed nodes of the plurality of managed nodes, wherein the attribute value of the hostDecision attribute is specific to the Ansible module and is received from a source, and wherein the one or more managed nodes on which the task is executed is based on the attribute value of the hostDecision attribute.

20. The computer system of claim 19, wherein the source from which the attribute value of the hostDecision attribute is received is a developer of the Ansible module, a user of the Ansible module, an initiator or user of the task, or the primary node.

* * * * *